US011853622B2

(12) United States Patent
Chen et al.

(10) Patent No.: US 11,853,622 B2
(45) Date of Patent: Dec. 26, 2023

(54) CLOUD PRINTING METHOD AND CLOUD PRINTING SYSTEM

(71) Applicant: ZHUHAI PANTUM ELECTRONICS CO., LTD., Guangdong (CN)

(72) Inventors: Yinggui Chen, Guangdong (CN); Jiade Li, Guangdong (CN)

(73) Assignee: ZHUHAI PANTUM ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 17/944,690

(22) Filed: Sep. 14, 2022

(65) Prior Publication Data
US 2023/0138709 A1 May 4, 2023

(51) Int. Cl.
G06F 3/12 (2006.01)
(52) U.S. Cl.
CPC .......... G06F 3/1206 (2013.01); G06F 3/1226 (2013.01); G06F 3/1247 (2013.01); G06F 3/1265 (2013.01); G06F 3/1268 (2013.01); G06F 3/1285 (2013.01); G06F 3/1292 (2013.01)
(58) Field of Classification Search
CPC .... G06F 3/1206; G06F 3/1226; G06F 3/1247; G06F 3/1265; G06F 3/1268; G06F 3/1285; G06F 3/1292
See application file for complete search history.

(56) References Cited

U.S. PATENT DOCUMENTS

| | | | | |
|---|---|---|---|---|
| 2007/0097416 A1* | 5/2007 | Higashimura | ........ | G06F 3/1285 358/1.15 |
| 2008/0158581 A1* | 7/2008 | Ferlitsch | ............... | G06F 3/1288 358/1.15 |
| 2013/0242335 A1* | 9/2013 | Naitoh | .................. | G06F 3/1238 358/1.14 |
| 2018/0067701 A1* | 3/2018 | Shirai | ............... | G06K 15/1848 |

* cited by examiner

Primary Examiner — John R Wallace
(74) Attorney, Agent, or Firm — Carlson, Gaskey & Olds, P.C.

(57) ABSTRACT

A cloud printing method and a cloud printing system includes: sending a print request to a first server when a file is clicked at first application of a client to execute printing; determining whether a target printer supports printing the file; transmitting the file to the target printer to execute printout of the file based on that the target printer supports printing the file; transmitting the file to a printer manufacturer server or to a second application based on that the target printer does not support printing the file; converting a data format of the file into a data format supported by the target printer to generate a print job; sending the print request to the target printer, and transmitting the print job to the target printer to execute printout of the print job.

6 Claims, 3 Drawing Sheets

CLOUD PRINTING METHOD AND CLOUD PRINTING SYSTEM

CROSS-REFERENCE TO RELATED APPLICATIONS

The present application claims priority to Chinese Patent Application No. 202111264281.8, filed on Oct. 28, 2021, the content of which is incorporated herein by reference in its entirety.

TECHNICAL FIELD

The present disclosure relates to a printing method and, in particular, to a method and a system for realizing data printing by a cloud server.

BACKGROUND

The printer is an imaging device, a printing APP can be installed on a client (such as a mobile phone) to allow users to realize mobile printing of the printer. The mobile printing in the related art requires the user to download a printing application on the mobile phone before using the mobile printing function. In order to implement the mobile printing on widely applied instant messaging applications (such as QQ), the files need to be transmitted to a cloud server established by a printing manufacturer itself to process the files. The transmission and processing of files are complicated, resulting in a long printing time and a poor user experience.

SUMMARY

Embodiments of the present disclosure provide a cloud printing method and a cloud printing system for implementing side-stream process of a file so as to improve the printing efficiency.

In an aspect, an embodiment of the present disclosure provides a cloud printing method, including: sending a print request to a first server in response to a file being clicked at first application of a client to execute printing; determining, by the first server, whether a target printer supports printing the file; transmitting, by the first server, the file to the target printer to execute printout of the file based on that the target printer supports printing the file; transmitting, by the first server, the file to a printer manufacturer server or to a second application based on that the target printer does not support printing the file; converting, by the printer manufacturer server or the second application, a data format of the file into a data format supported by the target printer to generate a print job; sending, by the printer manufacturer server or the second application, the print request to the target printer, and transmitting the print job to the target printer to execute printout of the print job.

In another aspect, an embodiment of the present disclosure provides a cloud printing system including a client, a first server and a target printer. The client is configured to send a print request to a first server when a file is clicked at first application of the client to execute printing. The first server is configured to determine whether the target printer supports printing the file, and transmit the file to the target printer to execute printout of the file based on that the target printer supports printing the file, or transmit the file to a printer manufacturer server or to a second application based on that the target printer does not support printing the file. The target printer it configured to execute printout of a print job when receiving the print request sent from the printer manufacturer server or the second application after the printer manufacturer server or the second application converts a data format of the file into a data format supported by the target printer to generate the print job.

An embodiment of the present disclosure provides an electronic device which includes at least one processor, and a memory configured to store instructions executable by the at least one processor. The instructions cause the at least one processor to implement the above mentioned method.

An embodiment of the present disclosure provides a computer-readable storage medium on which a computer program is stored. The computer program is executed to implement the steps of the above mentioned method.

The following technical effects can be achieved through the embodiments of the present disclosure:

1. Regarding the printers which supports general format printing, the print files sent from the application server of the non-printing manufacturer can directly be received, so that the file forwarding link and the file transmission time can be reduced, and the user experience can be improved.

2. If all target printers support common format printing, the development and deployment of printer manufacturer server can be facilitated, and the development and operation costs can be saved.

3. Regarding the complex printing file formats, different printing needs of the users can be satisfied by using the printer manufacturer server or performing file conversion process.

BRIEF DESCRIPTION OF DRAWINGS

In order to better illustrate the technical solutions of embodiments of the present disclosure, the following briefly introduces the accompanying drawings used in the embodiments. It is appreciated that, the drawings in the following description are only some embodiments of the present disclosure. For those skilled in the art, other drawings can also be obtained from these drawings without any creative effort.

DESCRIPTION OF EMBODIMENTS

In order to better understand the technical solutions of the present disclosure, the embodiments of the present disclosure are described in detail below with reference to the accompanying drawings.

It should be understood that the described embodiments are only some but not all of the embodiments of the present disclosure. Based on the embodiments in the present disclosure, all other embodiments obtained by those skilled in the art without any creative effort shall fall within the protection scope of the present disclosure.

In the present disclosure, the imaging device is a device having at least one function related to imaging. The above-mentioned functions related to imaging may include, but are not limited to, printing function, scanning function, copying function, and fax function. For example:

A single-function printer: an imaging device having only printing function.

A multi-function printer: an imaging device having printing, copying, scanning and/or fax functions has and having a selective number of paper trays.

A digital composite machine: a machine having basic copy function with optional printing, scanning, or fax function, which performs the file output by means of laser printing based on the digital principle and is capable of editing the image and text as needed. The digital composite machine can process a paper tray with a large capacity, and has a large-capacity memory, a large-capacity hard-disk, powerful network support and multitasking parallel processing capability.

Figure 1:
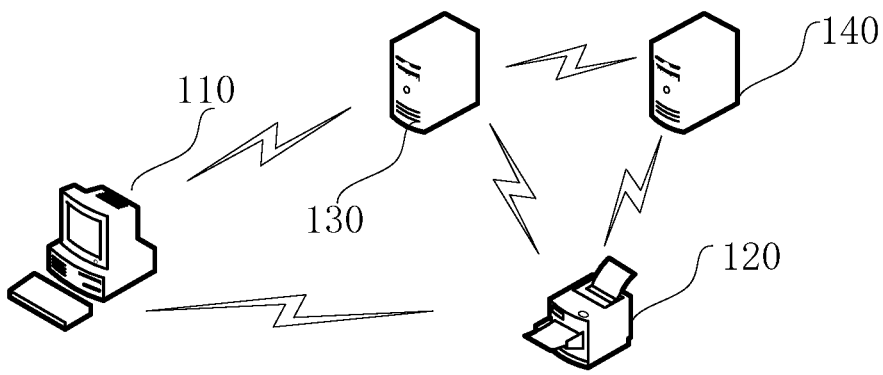
FIG. 1 is an exemplary diagram of a system adaptive to a cloud printing method according to an embodiment of the present disclosure.

The following is an example to illustrate an applicable scenario of the cloud printing method according to an embodiments of the present disclosure. As shown in FIG. 1, FIG. 1 is an exemplary diagram of the system which is adoptive to the method according to an embodiment of the present disclosure, including: a first control terminal 110 and an imaging device 120. Data communication is performed between the first control terminal 110 and the imaging device 120. The above-mentioned imaging device 120 may include, but is not limited to, the following devices: a single-function printer, a multi-function printer, a digital composite machine, and the like. In an embodiment, the system for the application scenario may further include a first server 130 and a printer manufacturer server 140.

The first control terminal may be an electronic device at which a print driver is installed, such as a computer, or an electronic device which can communicate with the printer, such as a mobile phone or a mobile tablet, and can also be generally referred to as a client or a host.

The connection manner between the first control terminal 110 and the imaging device 120 is not limited in the embodiments of the present disclosure. In an embodiment, the first control terminal 110 and the imaging device 120 can be connected through a local area network. In another embodiment, the imaging device 120 can be connected to the first control terminal 110 through a USB cable. In another embodiment, the imaging device 120 may be connected to the first control terminal 110 through a wireless means, such as Bluetooth and Wi-Fi Direct. In another embodiment, the first control terminal 110 communicates with the first server 130. The first server 130 is capable of communicating with the imaging device 120. The first control terminal 110 exchanges information with the imaging device 120 through the first server 130. In another embodiment, the first control terminal 110 communicates with the first server 130, and the first server 130 communicates with the printer manufacturer server 140. The printer manufacturer server 140 is capable of communicating with the imaging device 120. The printer manufacturer server 140 registers and manages the imaging device 120 connected to the Internet. The first control terminal 110 exchanges information with the imaging device 120 through the first server 130 and the printer manufacturer server 140.

In an embodiment of the present disclosure, a print job may be sent by a driving program of the first control terminal 110 to the imaging device 120 to execute a printout. The first control terminal 110 can add an imaging device by using an application to realize functions such as quick printing. The application may be DingTalk, QQ, and the like. The first server may be the DingTalk server or the QQ server.

Embodiment 1

Figure 2:
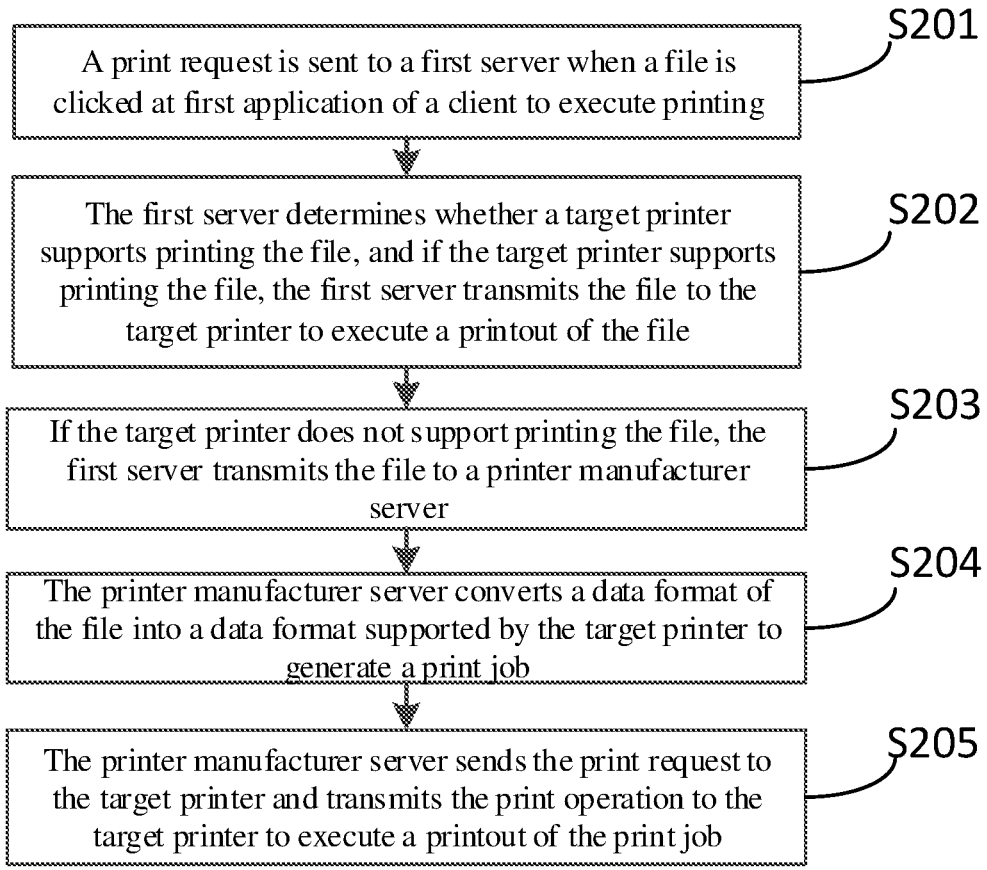
FIG. 2 is a schematic flowchart of a cloud printing method according to Embodiment 1 of the present disclosure.

An embodiment of the present disclosure provides a cloud printing method. As shown in FIG. 2, the method includes:

Step 201: a print request is sent to a first server when a file is clicked at first application of a client to execute printing.

Step 202: the first server determines whether a target printer supports printing the file, and if the target printer supports printing the file, the first server transmits the file to the target printer to execute a printout of the file.

Step 203: if the target printer does not support printing the file, the first server transmits the file to a printer manufacturer server.

Step 204: the printer manufacturer server converts a data format of the file into a data format supported by the target printer to generate a print job.

Step 205: the printer manufacturer server sends the print request to the target printer and transmits the print job to the target printer to execute a printout of the print job.

In the present disclosure, it is determined at the first server whether the file can be directly sent to the target printer to execute the printout. If the target printer supports the printing of the file that a user wants to print, the forwarding process of the file can be saved and the printing efficiency can be improved.

In an embodiment, the first server transmitting the file to the printer manufacturer server includes: a uniform resource locator (URL) of the file and device information of the target printer.

The printer manufacturer server converts the data format of the file into the data format supported by the target printer to generate the print job includes: the printer manufacturer server downloads the file from the first server based on the URL of the file; identifies a print data format supported by the target printer based on device information of the target printer; and converts the file to generate the print job based on the print data format.

In an embodiment, the printer manufacturer server sending the print request to the target printer includes: sending a URL of the print job to the target printer to make the target printer download the print job from the printer manufacturer server.

In the present disclosure, the user can use the instant messaging application to perform printing in a control terminal (such as a mobile phone), and can transmit complex documents to the printer manufacturer server for processing, so as to meet the different printing requirements of the user. If a file to be printed is in a general or commonly used format, such as a PDF file or a word file, the file can be transmitted by the first application server to the target printer for outputting to improve the printing efficiency. If a file is in a format that is not supported by the printer, the first server can transmit the file to the printer manufacturer server for image processing to complete the data format conversion of the file, so as to meet the printing requirements of the target printer to execute the printout process, and meet the different printing requirements of the user.

Embodiment 2

An embodiment of the present disclosure provides a cloud printing method. The method includes:

A print request is sent to a first server when a file is clicked at first application (such as an instant messaging application) of a client to execute printing; the first server determines whether a target printer supports printing the file. If the target printer supports printing the file, the first server transmits the file to the target printer to execute a printout of the file.

If the target printer does not support printing the file, the first server transmits the file to a second application (such as a printing application).

The second application converts a data format of the file into a data format supported by the target printer to generate a print job.

The second application sends the print request to the target printer and transmits the print job to the target printer to execute a printout of the print job.

The second application may be a printing APP provided by the printer manufacturer, or a specific application for image processing.

During using the manufacturer application, the file that does not support printing can be converted into the data format supported by the target device, the processing of the printer manufacturer server can be reduced and even fast printing can be implemented by using the local printing application, instead of providing the printer manufacturer server.

Embodiment 3

An embodiment of the present disclosure provides a cloud printing method. The method includes:

A print request is sent to a first server when a file is clicked at first application of a client to execute printing.

The first server determines whether a target printer supports printing the file. If the target printer supports printing the file, the first server transmits the file to the target printer to execute a printout of the file.

If the target printer does not support printing the file, the first server transmits the file to a second application (such as a printing APP).

The second application converts a data format of the file into a data format supported by the target printer to generate a print job.

The second application transmits the print job to the printer manufacturer server.

The second application sends the print request to the target printer and transmits the print job to the target printer to execute a printout of the print job.

In the present disclosure, the manufacturer application of the printer can be used to implement the format conversion processing of the file, and the print job generated after the conversion can also be transmitted to the target printer through the printer manufacturer server, in such a manner that the users are facilitated to implement cloud printing and quickly implement the image processing by using the local application. Further, it is not required to add too many file processing functions to the printer manufacturer server.

Embodiment 4

An embodiment of the present disclosure provides a cloud printing system. The system includes a client, a first server and a printer. The cloud printing system can meet the use's requirement of not only fast printing, but also printing special document formats.

A print request is sent to a first server when a file is clicked at first application of a client to execute printing. The first server determines whether a target printer supports printing the file.

If the target printer supports printing the file, the first server transmits the file to the target printer to execute a printout of the file. If the target printer does not support printing the file, the first server transmits the file to a printer manufacturer server.

The second application converts a data format of the file into a data format supported by the target printer to generate a print job.

The printer manufacturer server sends the print request to the target printer to make the target printer to execute a printout of the print job.

By the embodiments of the present disclosure, the first server is used as the shunt transmission control terminal for file printing. If the file to be printed by the user belongs to what the target printer can output directly, the first server transfers the file to the target printer for output, improving the printing efficiency. If the target printer does not support file printing, the first server transmits the file to the printer manufacturer server to convert and then transmits the file to the target printer for output, thereby satisfying the user's printing requirements.

In an embodiment, the first server transmitting the file to the printer manufacturer server includes a URL of the file and device information of the target printer.

In an embodiment, the printer manufacturer server converting the data format of the file into the data format supported by the target printer to generate the print job includes: the printer manufacturer server downloads the file from the first server based on the URL of the file; identifies a print data format supported by the target printer based on device information of the target printer; and converts the file to generate the print job based on the print data format.

In an embodiment, the printer manufacturer server sending the print request to the target printer includes: sending a URL of the print job to the target printer to make the target printer download the print job from the printer manufacturer server.

In an embodiment, if the target printer does not support printing the file, the first server or the client transmits the file to a second application (such as a printing APP). The second application converts a data format of the file into a data format supported by the target printer to generate a print job. The second application transmits the print job to the printer manufacturer server. The printer manufacturer server sends the print request to the target printer and transmits the print job to the target printer to execute a printout of the print job.

The same parts of the embodiments of the present disclosure as the above-mentioned embodiments will not be described repeatedly.

Embodiment 5

An embodiment of the present disclosure provides a cloud printing system. The system includes a client, a first server and a printer. The cloud printing system can meet the use's requirement of not only fast printing, but also printing special document formats.

In the system, a print request is sent to a first server when a file is clicked at first application of a client to execute printing. The first server determines whether a target printer supports printing the file. If the target printer supports printing the file, the first server transmits the file to the target printer to execute a printout of the file.

If the target printer does not support printing the file, the first server or the client transmits the file to a second application (such as printing APP).

The second application converts a data format of the file into a data format supported by the target printer to generate a print job.

The printer manufacturer server sends the print request to the target printer transmits the print job to the target printer to execute a printout of the print job.

In an embodiment, the processing of the printer manufacturer server can be reduced and even fast printing can be implemented by using the local printing application, instead of providing the printer manufacturer server.

Moreover, an embodiment of the present disclosure provides an electronic device which includes a memory, a processor and a computer program.

The computer program is stored in the memory and configured to be executed by the processor to implement the above-mentioned method.

In addition, an embodiment of the present disclosure provides a computer-readable storage medium on which a computer program is stored. The computer program is executed to implement the steps of the above-mentioned method.

The embodiments of the present disclosure brings out the following technical effects:

1. When the user executes file printing in an instant messaging application such as QQ and Dingtalk, in case the file is in a format supported by the target printer, the file transmission process is simple and fast, so that the printer can directly receive the file to be printed from the server associated with the instant messaging application, and the printing efficiency is improved.
2. If the target printer does not support printing the file, the server associated with the instant messaging application can also transfer the file to the printer manufacturer server to convert the data format of the file, so that the target printer can output the file to further meet the user's printing requirements.
3. The user uses the application to select the file, and the application automatically selects the most suitable printing process for the printer to print based on the file type or specific rules, so as to achieve the printing effect of file intelligent shunt.
4. The application provided by the printer manufacturer may also be applied accompanied with the server associated with the instant messaging application to realize the conversion and printing of special documents.

APPLICATION EXAMPLE

The following describes the process of implementing cloud printing in a mobile phone by specific application of the embodiments of the present disclosure.

Figure 3:
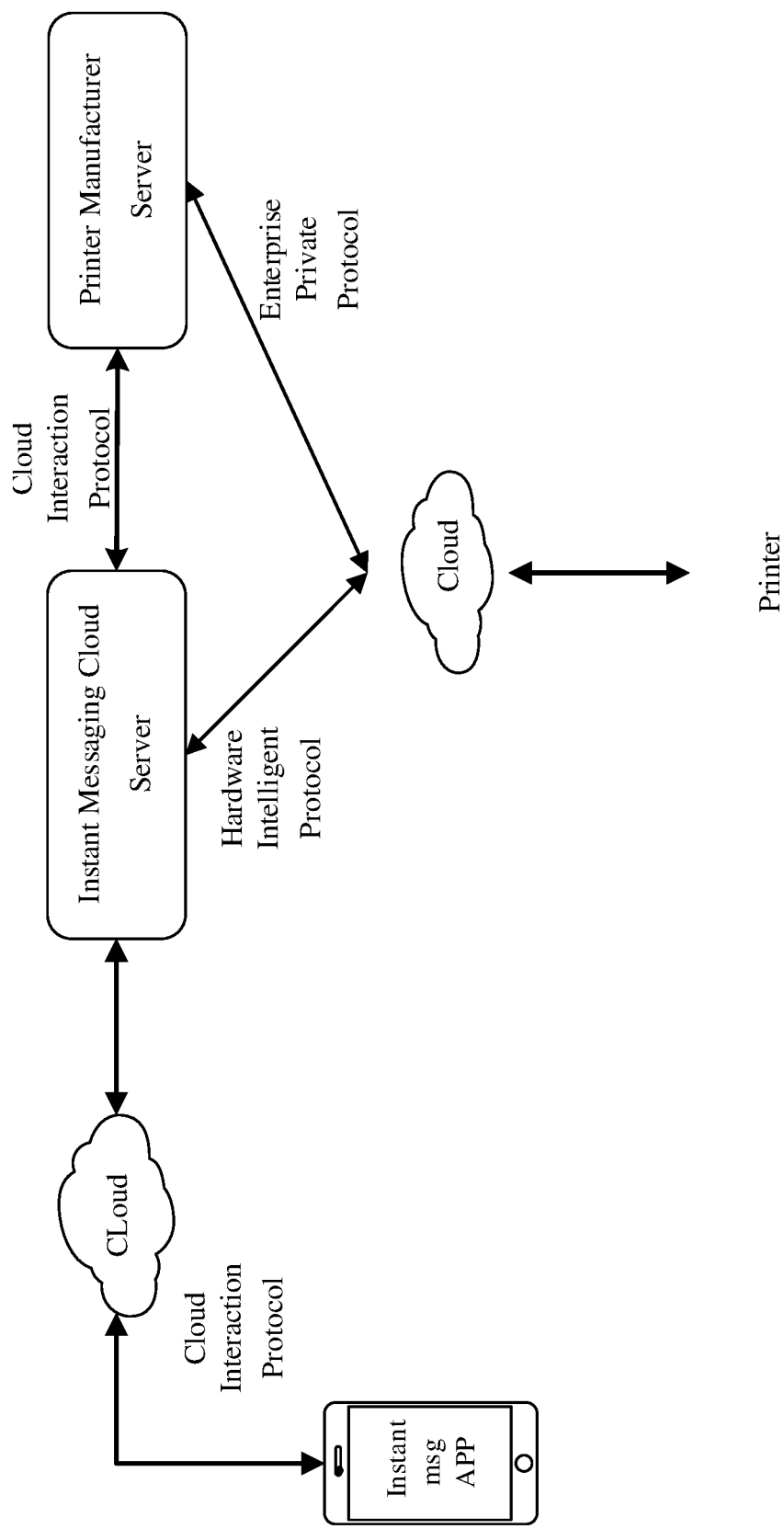
FIG. 3 is a schematic diagram of a specific application architecture of cloud printing.

FIG. 3 is a schematic diagram of an architecture of cloud printing. The application takes the instant messaging APP as an example, and the first server takes the instant messaging server as an example.

As shown in FIG. 3, the instant messaging APP is installed on the mobile phone, and the instant messaging APP exchanges information with the instant messaging server through the cloud to meet the user's communication needs.

A cloud server interaction protocol exits between the instant messaging cloud server and the printer manufacturer server. The instant messaging cloud server can transmit files to the printer manufacturer server, and the printer manufacturer server can also send the device information of the managed printer to the instant messaging cloud server to realize instant messaging APP binding to printer. The printer can communicate with the instant messaging cloud server through a hardware intelligent protocol. The printer manufacturer server can discover the printer and complete the registration and monitoring of the printer through an enterprise private protocol.

Figure 4:
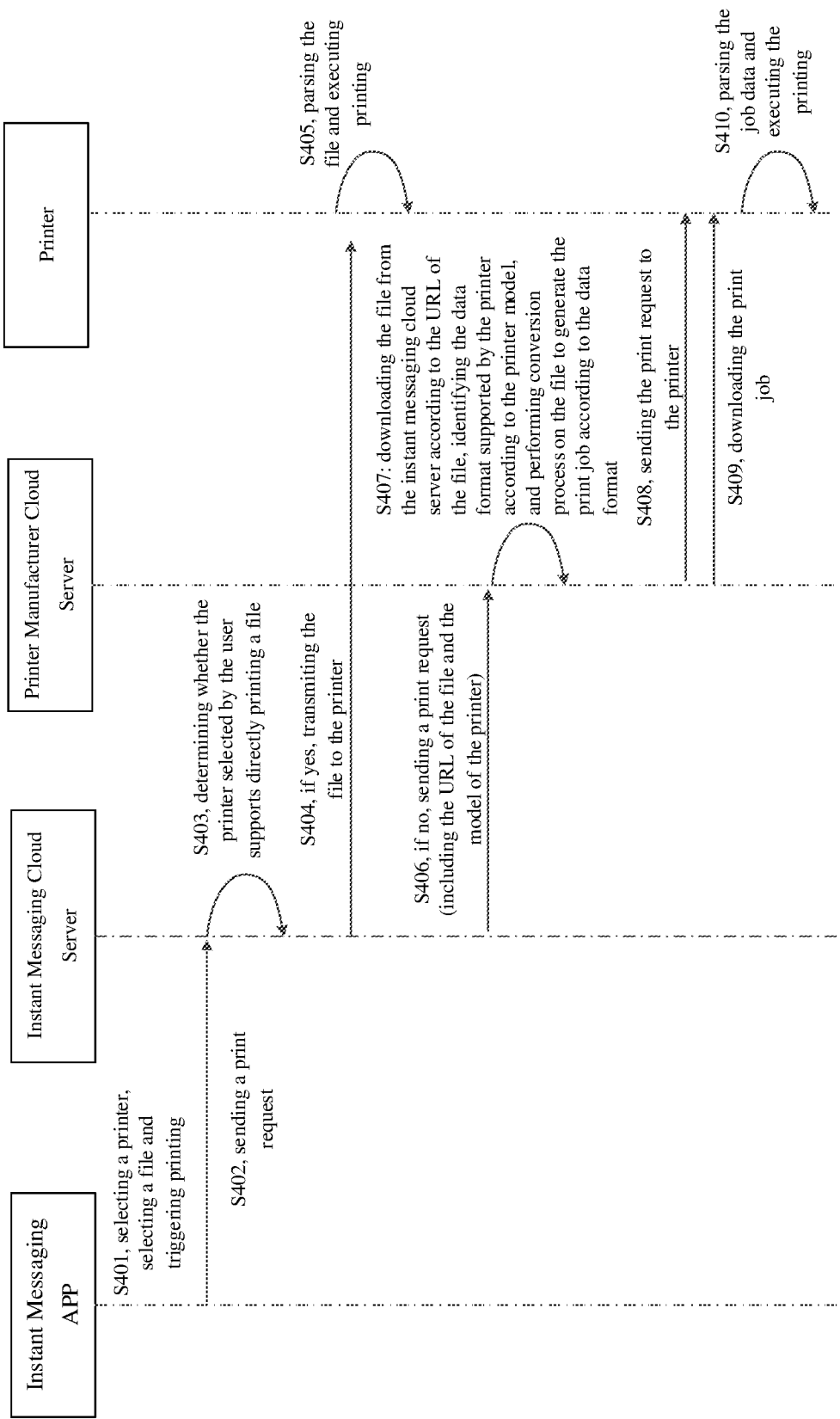
FIG. 4 is a schematic flowchart of implementing cloud printing in a mobile phone.

FIG. 4 is a schematic flowchart of implementing cloud printing in a mobile phone, including the following steps.

Step S401: the user selects a printer as the target printer in the instant messaging APP to execute the printout of the file; the user triggers printing after selecting a file. The selected file may include an Office document, a PDF document, a TXT document, a picture, etc.

Step S402: the instant messaging APP sends a print request to the instant messaging cloud server.

Step S403: the instant messaging cloud server determines whether the printer selected by the user supports printing a file directly, or whether the printer selected by the user supports printing a file selected by the user.

Step S404: if yes, the instant messaging cloud server transmits the file to the printer.

Step S405: the printer parses the file and executes printing.

Step S406: if no, the instant messaging cloud server sends a print request to the printer manufacturer cloud server. The print request includes the URL of the file and the model of the printer.

Step S407: the printer manufacturer cloud server downloads the file from the instant messaging cloud server according to the URL of the file, identifies the data format supported by the printer according to the printer model, and performs conversion process on the file to generate a print job according to the data format.

Step S408: the printer manufacturer cloud server sends the print request to the printer.

Step S409: the printer downloads the print job from the printer manufacturer cloud server according to the print request.

Step S410: the printer parses the job data and executes the printout.

In the embodiments of the present disclosure, the users are facilitated to print a file fast at a commonly used instant messaging APP such as Dingtalk and QQ. The complex files to be printed can be converted and then printed through the printer manufacturer server to meet different printing needs of the users.

The above descriptions are only preferred embodiments of the present disclosure, and are not intended to limit the present disclosure. Any modifications, equivalent replacements, improvements, etc. made within the present disclosure shall be included within the scope of the protection of the present disclosure.

What is claimed is:

1. A cloud printing method, comprising:
   sending a print request to a first server in response to a file being clicked at first application of a client to execute printing;
   determining, by the first server, whether a target printer supports printing the file;
   transmitting, by the first server, the file to a printer manufacturer server or to a second application based on determining that the target printer does not support printing the file;
   converting, by the printer manufacturer server or the second application, a data format of the file into a data format supported by the target printer to generate a print job;
   sending, by the printer manufacturer server or the second application, the print request to the target printer, transmitting the print job to the target printer to execute printout of the print job, wherein said transmitting, by the first server, the file to the printer manufacturer server comprises: transmitting, by the first server, a uniform resource locator (URL) of the file and device information of the target printer, and wherein said converting, by the printer manufacturer server, the data format of the file into the data format supported by the target printer to generate the print job comprises:

downloading, by the printer manufacturer server, the file from the first server based on the URL of the file;

identifying a print data format supported by the target printer based on device information of the target printer; and converting the file to generate the print job based on the print data format.

2. The method according to claim 1, wherein said sending, by the printer manufacturer server, the print request to the target printer comprises:

sending, by the printer manufacturer, a uniform resource locator (URL) of the print job to the target printer so that the target printer downloads the print job from the printer manufacturer server.

3. The method according to claim 1, further comprising:

transmitting, by the second application, the print job to the print manufacturer server after the second application generates the print job, sending, by the print manufacturer server, the print request to the target printer, and transmitting the print job to the target printer to execute printout of the print job.

4. A cloud printing system, comprising, a first server, a target printer and a printer manufacturer server, wherein the first server is configured to:

receive a print request to form a client when a file is selected at first application of the client to execute printing;

determine whether the target printer supports printing the file, and transmit the file to the printer manufacturer server or to a second application based on determining that the target printer does not support printing the file, wherein transmitting the file to the printer manufacturer server comprises: transmitting a uniform resource locator (URL) of the file and device information of the target printer to the printer manufacturer server;

the target printer is configured to execute printout of a print job when receiving the print request sent from the printer manufacturer server or the second application after the printer manufacturer server or the second application converts a data format of the file into a data format supported by the target printer to generate the print job; and the printer manufacturer server is configured to:

download the file from the first server based on the URL of the file;

identify a print data format supported by the target printer based on device information of the target printer; and convert the file to generate the print job based on the print data format.

5. The system according to claim 4, wherein the printer manufacturer server is further configured to:

send a uniform resource locator (URL) of the print job to the target printer so that the target printer downloads the print job from the printer manufacturer server.

6. The system according to claim 4, wherein the second application is configured to generate the print job, transmit the print job to the printer manufacturer server, and the printer manufacturer server is further configured to send the print request to the target printer, and transmit the print job to the target printer to execute printout of the print job.

* * * * *